(12) United States Patent
Lykken

(10) Patent No.: US 6,899,191 B1
(45) Date of Patent: May 31, 2005

(54) ACTUATED SKI SUSPENSION

(75) Inventor: Tom Lykken, Fargo, ND (US)

(73) Assignee: Sno-Bear Industries, LLC, Harwood, ND (US)

( * ) Notice: Subject to any disclaimer, the term of this patent is extended or adjusted under 35 U.S.C. 154(b) by 0 days.

(21) Appl. No.: 10/769,313

(22) Filed: Jan. 30, 2004

(51) Int. Cl.⁷ .............................................. B62M 27/02
(52) U.S. Cl. ....................................... 180/182; 180/186
(58) Field of Search ............................... 180/182, 186; 280/6.15

(56) References Cited

U.S. PATENT DOCUMENTS

| 3,656,557 | A | 4/1972 | Eskelson et al. ............. 172/277 |
|---|---|---|---|
| 3,685,404 | A | 8/1972 | Rich et al. ....................... 94/44 |
| RE29,356 | E | 8/1977 | Bennett ......................... 299/25 |
| 4,344,637 | A | 8/1982 | Williams, Jr. et al. ........ 280/21 |
| 4,523,398 | A | 6/1985 | Scheibel et al. .............. 37/220 |
| 4,736,961 | A * | 4/1988 | Latvys ....................... 280/6.15 |
| 4,836,578 | A * | 6/1989 | Soltis ........................ 280/6.15 |
| 6,032,752 | A | 3/2000 | Karpik et al. ............... 180/9.52 |
| 6,036,201 | A * | 3/2000 | Pond et al. ............... 280/5.514 |
| 6,279,931 | B1 | 8/2001 | Kopczynski .......... 280/124.111 |
| 6,401,852 | B2 | 6/2002 | Lillbacka et al. ........... 180/193 |
| 2002/0084123 | A1 * | 7/2002 | Farsdale ...................... 180/182 |
| 2003/0051376 | A1 | 3/2003 | Lassonde et al. ............. 37/348 |

* cited by examiner

Primary Examiner—Tony Winner
(74) Attorney, Agent, or Firm—Curtis Harr

(57) ABSTRACT

This actuated ski suspension provides a method of raising and lowering a vehicle to which it is attached by raising and lowering the ski assembly in a vertical plane. Additionally, the process of raising and lowering the vehicle also incorporates a mechanism which effectively breaks frozen skis loose from the surface of snow or ice without causing damage to the skis and without requiring effort from the operator.

20 Claims, 5 Drawing Sheets

ACTUATED SKI SUSPENSION

BACKGROUND OF THE INVENTION

The present invention relates to an improvement in the mechanisms used to raise and lower skied vehicles from the surface of ice. More specifically, to an improvement in the mechanisms employed to raise and lower skied vehicles from the surface of ice that additionally incorporates a mechanism for effectively loosening a ski that has frozen into the ice, thereby allowing such a vehicle to be easily moved from place to place with the minimum amount of effort from the operators.

The use of skis in conjunction with vehicles or transportable structures intended for use in winter for off road situations is very popular today. The most common example of the vehicles so equipped is the snowmobile and skis are also used on transportable structures such as icehouses used for fishing on frozen lakes. A common characteristic to both of these is that if they are left to sit in one position over an extended period of time, the bottom surface of their skis can become frozen into the surface of the ice or snow upon which they are sitting. Due to the nature of icehouses and the fact that they are commonly left stationary for long periods of time, the freeze in of the skis is more problematic in this application and so the following discussion will focus on the circumstances surrounding the problem as it applies to icehouses. However, it must be noted that the same principles apply equally to snowmobiles as well as any other vehicle that employs the use of skis as a mechanism to travel over frozen surfaces.

Along with the use of skis, many icehouses in use today also employ a mechanism that allows the body of the icehouse to be raised up off of the frozen surface to allow for its transport and to be lowered down on to the surface to facilitate its use for ice fishing. One problem with the raising and lowering systems in use is that they often have a component of lateral ski movement in the raising and lowering process. This lateral movement, or scuffing, creates an additional problem that is associated with the ski freezing into the ice. The ski being frozen in locks it in place and therefore does not allow the ski to move laterally during the raising and lowering process. If the ski is unable to move in this manner, the raising and lowering process itself can be inhibited. If this occurs when the icehouse is in the lowered position, it makes it impossible to move it thereby creating a situation in which its usefulness is limited or requiring drastic measures to get the icehouse off the ice. On the other hand, if the locking of the raising and lowering mechanism due to ski freeze in occurs when the icehouse is in the raised position, its usefulness for ice fishing is limited, as its mobility is restriced.

Even in situations in which the other mechanisms of the icehouse are unaffected by ski freeze in, the ski's propensity to freeze to the surface of the ice can be problematic and expensive to icehouse operators. The difficulties arise from the fact that in order for the icehouse to be moved, either for simply changing fishing locations or to remove from the surface of the ice, the skis must be broken loose from the ice. At the very least, this requires that the operator physically break them free by going outside and applying lateral rocking, leveraged motions to the skis until they are free. This is a somewhat delicate operation as there are components of the skis and the undercarriage to which they are attached that are not designed to withstand these kinds of forces. If this process is not accomplished with the required degree of care, the resulting damage may not only increase the costs involved in the operation of an icehouse, but also increase the time required to move the icehouse as desired or required.

Therefore, it can be seen that it would be desirable to provide a mechanism employed for the raising and lowering of apparatuses such as icehouses that employ skis for movement over snow or ice in such a manner so that such icehouses can be quickly and effectively lowered for use as an ice fishing platform or raised so that it can be effectively transported. Additionally, it can also be seen that it would be desirable to provide such a mechanism that would incorporate a means by which a ski that has become frozen into the surface of the ice or snow can be easily and effectively broken free to facilitate the transport of the icehouse in a manner that does not damage the ski or any of the related components.

SUMMARY OF THE INVENTION

It is the primary objective of the present invention to provide a mechanism for the raising and lowering of apparatuses such as icehouses that employ skis for movement over snow or ice in such a manner so that such icehouses can be quickly and effectively lowered for use as an ice fishing platform or raised so that it can be effectively transported.

It is an additional objective of the present invention to provide such a mechanism for the raising and lowering of icehouses that would incorporate a means by which a ski that has become frozen into the surface of the ice or snow can be easily and effectively broken free to facilitate the transport of the icehouse in a manner that does not damage the ski or any of the related components.

These objectives are accomplished by the use of a suspension system designed specifically to be used with skis and on a portable structure, such as an icehouse, that is intended to be raised and lowered for use in ice fishing. In this purpose, the present invention is composed of a pair of skis that are attached to a plurality of suspension components which are in turn attached to the frame or chassis of the portable icehouse. The present invention also is constructed in a manner that the relative position of the skis with reference to the chassis and remaining components of the invention can be easily and freely manipulated in the vertical plane. This vertical movement is then employed to raise and lower the body of the icehouse to either facilitate ice fishing or its transport.

The suspension components of the present invention generally comprise two sets of components that mirror each other on either side of the icehouse. The two primary suspension components are the upper control arm and the lower control arm. The upper and lower control arms are both pivotally attached on their inner ends to the chassis or frame of the portable icehouse and each extend outwards in a relatively flat or horizontal manner. This positioning and attachment of the upper and lower control arms then provides the base upon which the remaining components are constructed.

The outer end of the upper control arm in turn provides the point of attachment for the upper pivot joint which is also attached on its lower surface to the vertical attachment pillar. This method of attachment provides the upper control arm with the capability of freely pivoting around its pivotal attachment to the chassis while allowing the vertical attachment pillar to remain in a substantially vertical orientation through the required up and down travel. The lower end of the vertical attachment pillar is then fixedly attached to the upper surface of the ski which effectively pivotally ties the ski to the chassis.

The outer end of the lower control arm provides the mounting position for the lower pivot joint which is also fixedly attached on its lower surface to the pivot joint base. As with the attachment of the upper control arm, these components allow the lower control arm to pivot around its connection to the chassis while allowing the pivot joint base to remain in a vertical orientation. The pivot joint base is in turn also attached to the upper surface of the ski. Thus, the ski is pivotally attached to the chassis in a manner so that the ski can maintain its general orientation to a large degree throughout the designed travel of the suspension components.

The travel of the suspension components and the vertical position of the ski in relation to the chassis are controlled by the same system. This system is composed of the shock absorber, the pivot arm, and the lift cylinder. The shock absorber is the component of the present invention that is employed to control the travel of the upper and lower control arms when the suspension is operating in a normal manner. To accomplish this purpose, the shock absorber is pivotally mounted between the upper end of the lower pivot joint and the outer edge of the pivot arm. Additionally, the shock absorber is also equipped with a spring element that exerts a downward force on the outer end of the lower control arm through its connection at the lower pivot joint. In circumstances that do not require suspension, the shock absorber can be replaced with a solid arm or a cylinder directly. This downward force in turn places downward force on the attached ski which counteracts the icehouse being suspended by the present invention.

The lift cylinder is the component of the present invention employed to control the vertical position of the ski in relation to the body of the portable icehouse and is therefore, the component that accomplishes the actual lifting and lowering of the icehouse for which the present invention is designed. For this purpose, the lift cylinder is pivotally attached between an upper corner of the chassis and the inside edge of the pivot arm. The lift cylinder is generally a hydraulic cylinder, although other similar devices (such as electric actuators) could be used, that is capable of being selectively expanded and contracted.

The expandable and contractible nature of the lift cylinder is specifically used to control the position pivot arm. The pivot arm is pivotally attached at its lower end to a portion of the chassis and extends generally upwards therefrom. As previously stated, the upper portion of the pivot arm, the pivot arm head, anchors the inner and outer ends of the shock absorber and lift cylinder respectively. Thus, as the lift cylinder is expanded, it forces the pivot arm head to rotate outward which in turn forces the shock absorber outward. The outward motion of the shock absorber then forces the ski downward, thereby lifting the icehouse.

Conversely, the contraction of the lift cylinder pulls the pivot arm head and the connected shock absorber inward. This motion pulls the lower control arm and the attached ski upwards which has the effect of lowering the icehouse towards the surface of the ice or snow. Therefore, with the lift cylinder component of the present invention fully contracted, the icehouse will sit of the surface of the ice thereby making it useable for ice fishing. However, the placement of the lift cylinder into the fully extend position raises the icehouse making it possible to transport it from one place to another.

The manner of construction of the present invention also confers an additional benefit when employed in these circumstances. This benefit is that the design and positioning of the upper and lower control arms also impart a slight side to side rolling motion to the ski as the present invention goes through the raising and lowering operations. The side to side rolling motion is a function of the design of the upper control arm. The upper control arm is shorter than the lower control arm giving it a shorter pivot radius as the present invention moves up and down. The shorter pivot radius results in a slight oscillation in the vertical orientation of the vertical attachment pillar as the lift cylinder is expanded and contracted. The attached skis are then imparted with a slight side to side roll that effectively breaks a frozen ski loose from the surface of the ice or snow with minimal effort. Thus, the present invention not only provides a mechanism for raising and lowering an icehouse for use in ice fishing or for transport, but also provides a built in mechanism for breaking frozen skis loose during these operations thereby eliminating the need for the operator to perform this necessary operation manually.

For a better understanding of the present invention reference should be made to the drawings and the description in which there are illustrated and described preferred embodiments of the present invention.

DESCRIPTION OF THE PREFERRED EMBODIMENT

Figure 1:
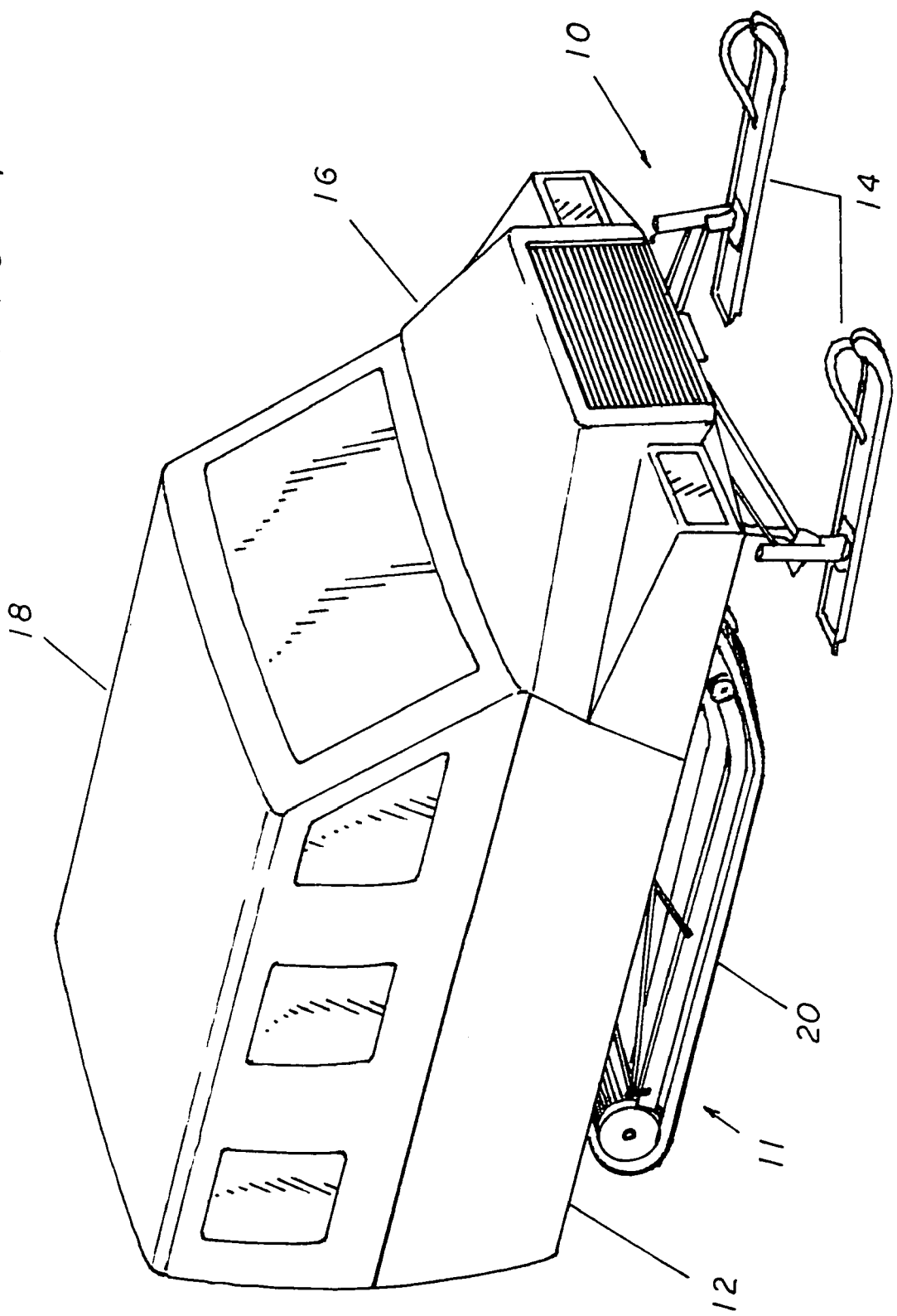
FIG. 1 is a perspective view of a powered utility vehicle equipped with the present invention illustrating its general configuration in this application.

Referring now to the drawings, and more specifically to FIG. 1, the actuated ski suspension 10 is a device designed to provide suspension to a vehicle that employs skis 14 as a surface contact component. This FIGURE illustrates the present invention as used with a tracked utility vehicle 12 but it is important to note that it works equally as well in all applications requiring suspended skis and is illustrated here only in this configuration for purposes of simplicity. Additionally, the illustrated tracked utility vehicle 12 in the instant case is configured as portable icehouse having a track drive 11 for propulsion, a cab 18 for the holding of passengers or cargo, and an extending front end 16 which generally contains the vehicle's engine and also provides for the placement of the present invention. In this configuration, the track 20 provides the forward impetus to drive the vehicle and the skis 14 provide the steering input. This arrangement works very well in snow and icy conditions and is therefore commonly employed in this type of vehicle.

Figure 2:
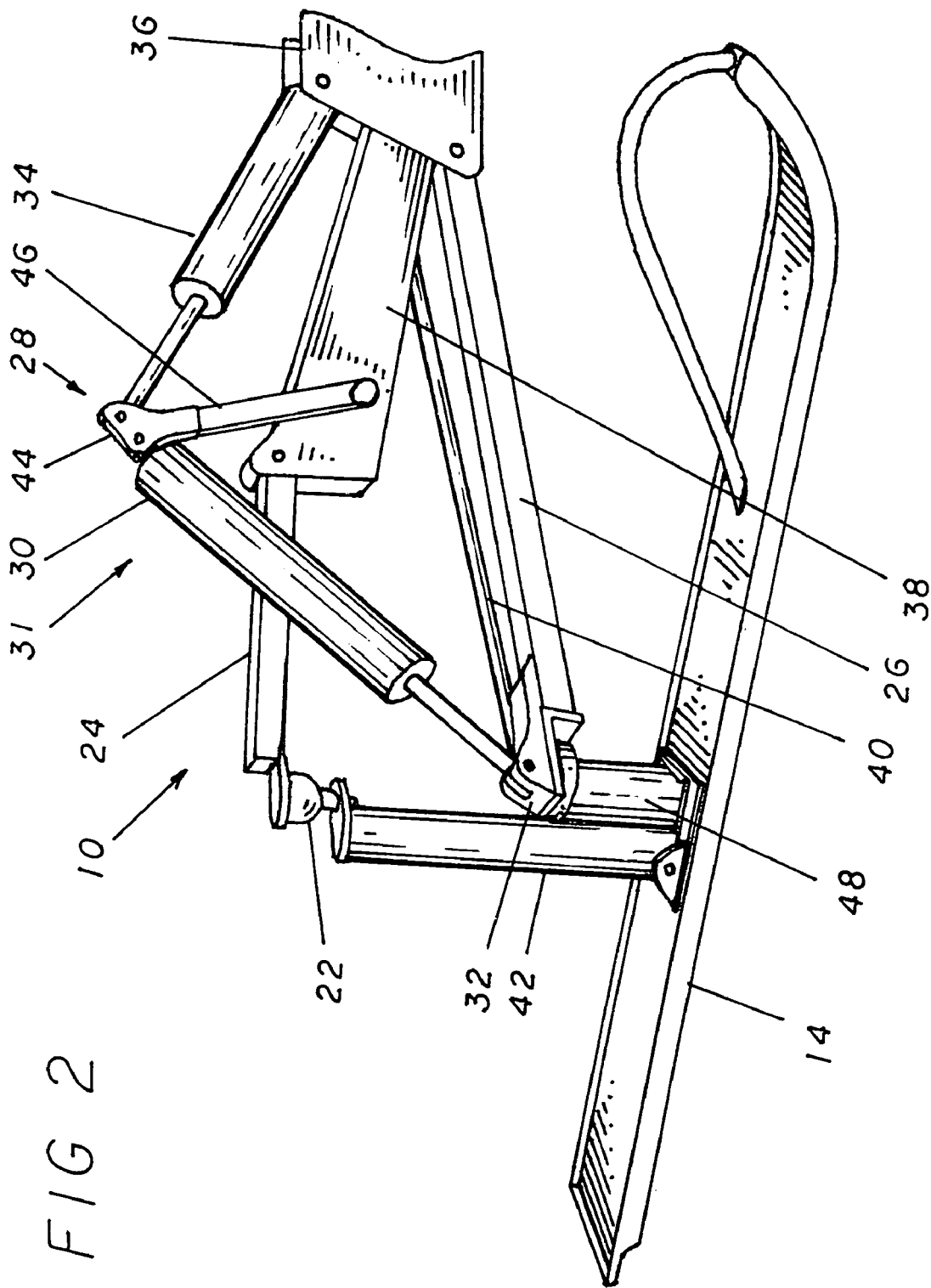
FIG. 2 is a perspective view of the present invention illustrating its manner of construction and the orientation of its major components.
Figure 3:
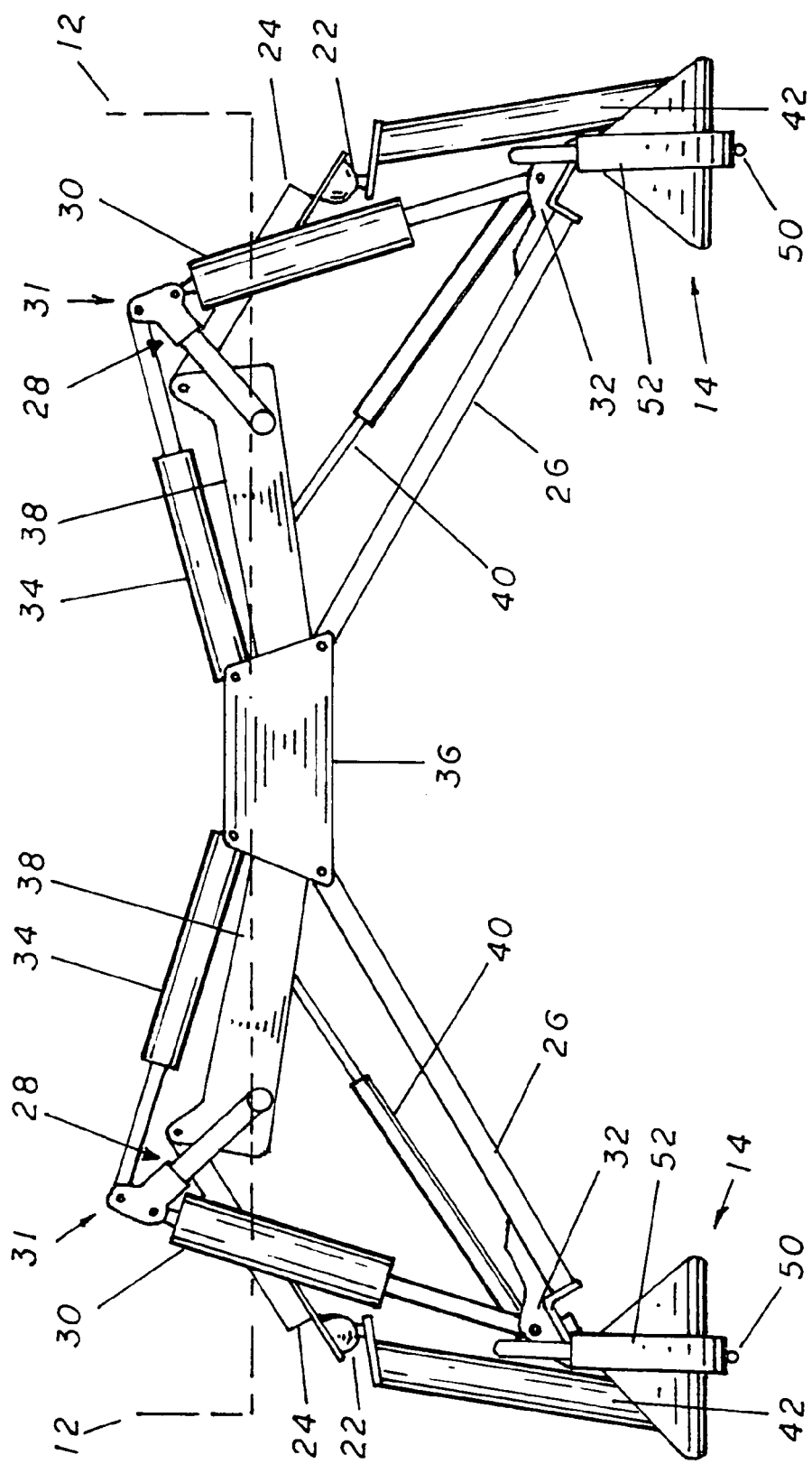
FIG. 3 is a front elevation view of the present invention illustrating the positioning of the skis in relation to the remaining components.

The overall configuration of the present invention and its general manner of construction are illustrated in FIGS. 2 and 3. In this application, a central chassis 36 component serves as the mounting point upon which all other components of the present invention are based. Each side of this chassis 36 component has extending outward from it a chassis arm 38. The chassis arm 38 is fixedly attached to the chassis 36 and extends outward therefrom at a slightly upward angle. The purpose of the chassis arms 38 are to provide the points of attachment and support for a plurality of the present invention's other components and will be discussed in greater detail below.

The lower outside corners of the chassis 36 provide the points of pivotal attachment for the inner ends of the lower control arms 26. The lower control arms 26 are one of the primary components of the suspension system as they help to tie the skis 14 to the chassis 36 in a pivotal manner. In this capacity, the lower control arms 26 extend outwardly from their pivotal attachment to the chassis 36 to a point at which they terminate at the lower pivot joints 32. Additionally, the pivotal attachment of the lower control arms 26 at the chassis 36 allows them to pivot between a slightly inclined orientation to a severely declined orientation limited only by their connection to the other components of the invention.

As previously stated, the outer ends of the lower control arms 26 provide the mounting point for the lower pivot joints 32. The lower pivot joints 32 in turn are fixedly attached to the upper surface of the skis 14 through the lower pivot joint bases 48. Thus, this method of attachment of the lower control arms 26 provides a mechanism by which the skis 14 may be partially attached while still being capable of maintaining an orientation which is independent to that of the chassis 36.

The upper outer corners of the chassis arm 38 provide the points of pivotal attachment for the upper control arms 24. The upper control arms 24 are the other primary component of the suspension system as they provide the link by which the pivotal attachment of the skis 14 to the chassis 36 is completed. The upper control arms 24 extend outwardly from their pivotal attachment to the chassis 36 to a point at which they terminate at the upper pivot joints 22. The upper pivot joints 22 are in turn fixedly attached to the upper ends of the vertical attachment pillars 42 which extend downward to the upper surface of the skis 14.

As with the lower control arms 26, this method of attaching the upper control arms 24 serves to attach the skis 14 in a pivotal manner while maintaining their independence. The pivotal connections described form a double link independent suspension, the main components of which form a trapezoidal configuration the outside edge of which is capable of maintaining a vertical orientation as the other components move up and down in the performance of the suspension's functions. Additionally, a pair of steering arms 40 extend in a similar manner as the lower control arms 26 that are employed to control the longitudinal orientation of the skis 14 and, therefore, the direction of the portable icehouse to which the present invention has been attached.

In addition to the suspension configuration described above, the present invention also incorporates a plurality of components employed to raise and lower the skis 14 in relation to the chassis 36. The first of these components are the lift cylinders 34. The lift cylinders 34 are hydraulic cylinders that are selectively expandable and contractible and which are pivotally attached at their inner ends to the upper outer corners of the chassis 36. From these points of attachment, the lift cylinders 34 extend outward to the point at which their outer ends pivotally attach to the inner side of the pivot arm heads 44 portion of the pivot arms 28. The pivot arms 28 are made up of a pivot arm body 46 which is pivotally attached at its lower end to the chassis arm 38 and supports the pivot arm head 44 at its upper end. Additionally, the pivot arms 28 extend upward from their pivotal attachment to the chassis arms 38 and are freely rotatable around this attachment. Through this method of attachment of the lift cylinders 34 and the pivot arms 28, the expansion and/or contraction of the lift cylinders 34 force the pivot arms 28 to rotate in a corresponding manner.

The rotation of the pivot arms 28 is important to the operation of the present invention because the outer portion of the pivot arm heads 44 provide the point of pivotal attachment of the inner ends of the shock absorbers 30, it is important to note that in circumstances where there is no need for suspension, the shock absorber 30 can be replaced by a solid link or a hydraulic cylinder. From these points of pivotal attachment, the shock absorbers 30 extend diagonally downwards to pivotally attach to the upper surfaces of the lower pivot joints 32. Additionally, the shock absorbers 30 are generally equipped with spring mechanisms (not shown) which operate to supply the downward force necessary for the suspension to function properly. The attachment of the shock absorbers 30 at their lower end completes the height control system 31 of the present invention.

Figure 4:
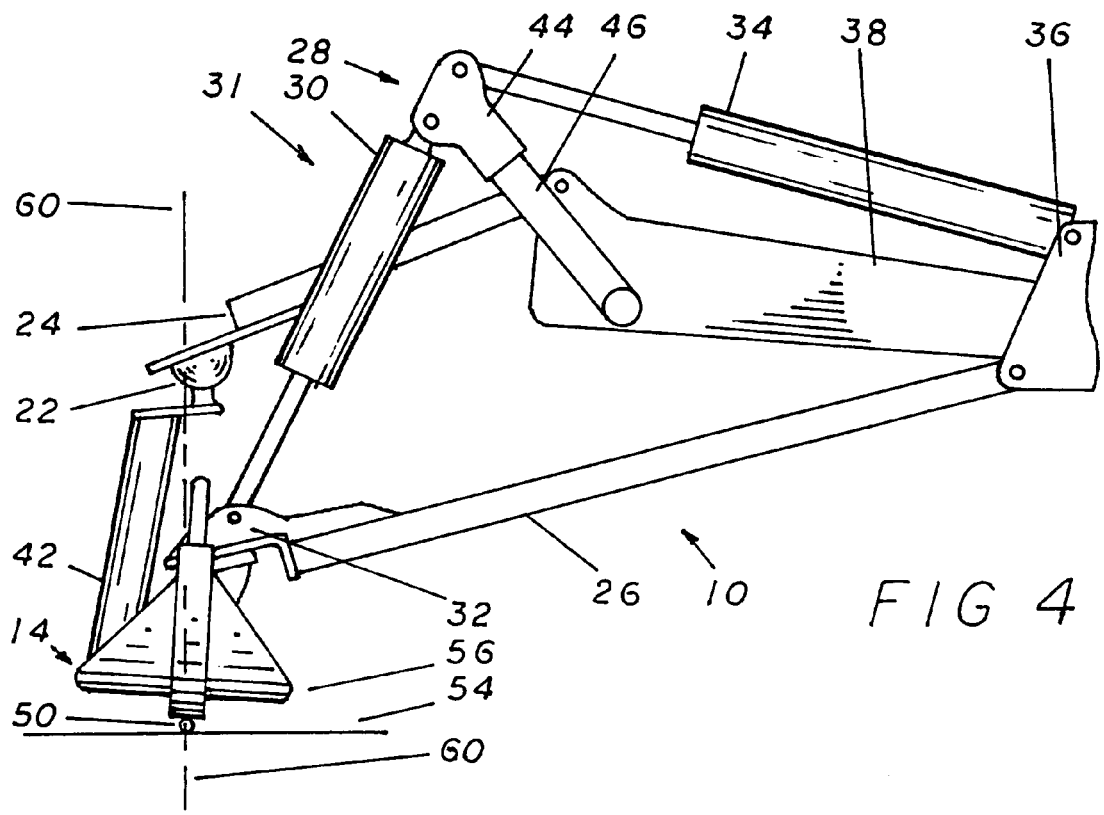
FIG. 4 is a front elevation view of one side of the present invention illustrating its configuration when the ski is extended to lift an attached apparatus off of the surface upon which the skis rests.
Figure 5:
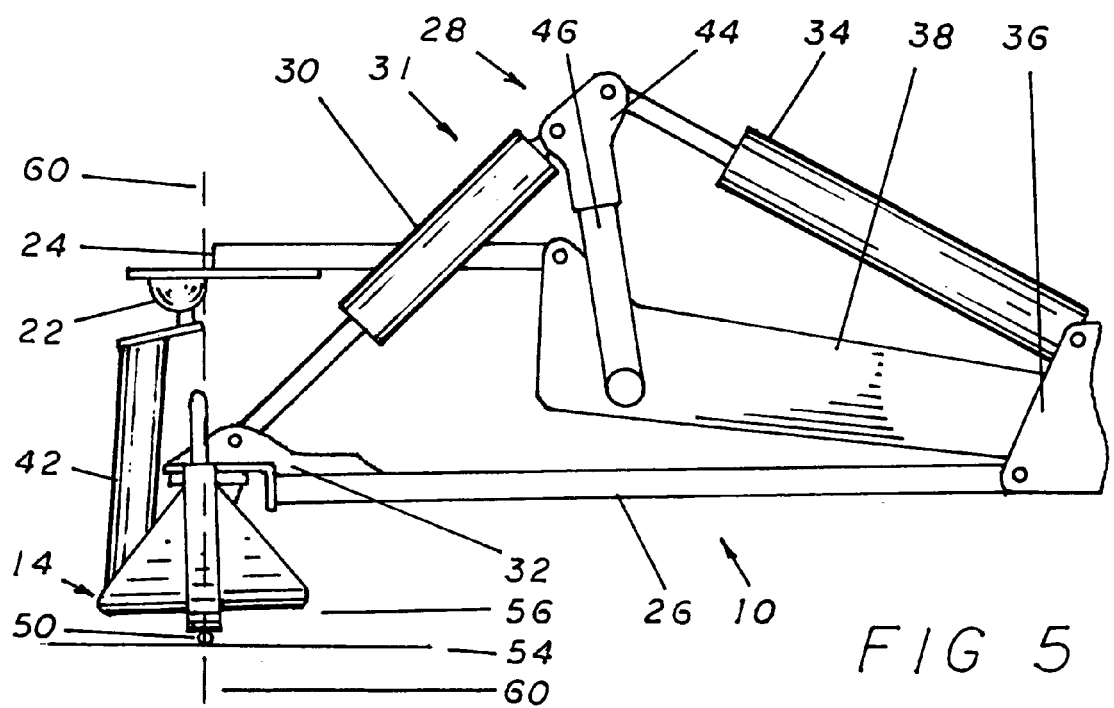
FIG. 5 is a front elevation view of one side of the present invention illustrating its configuration when the ski is being retracted to lower an attached apparatus towards the surface upon which the skis rests.
Figure 6:
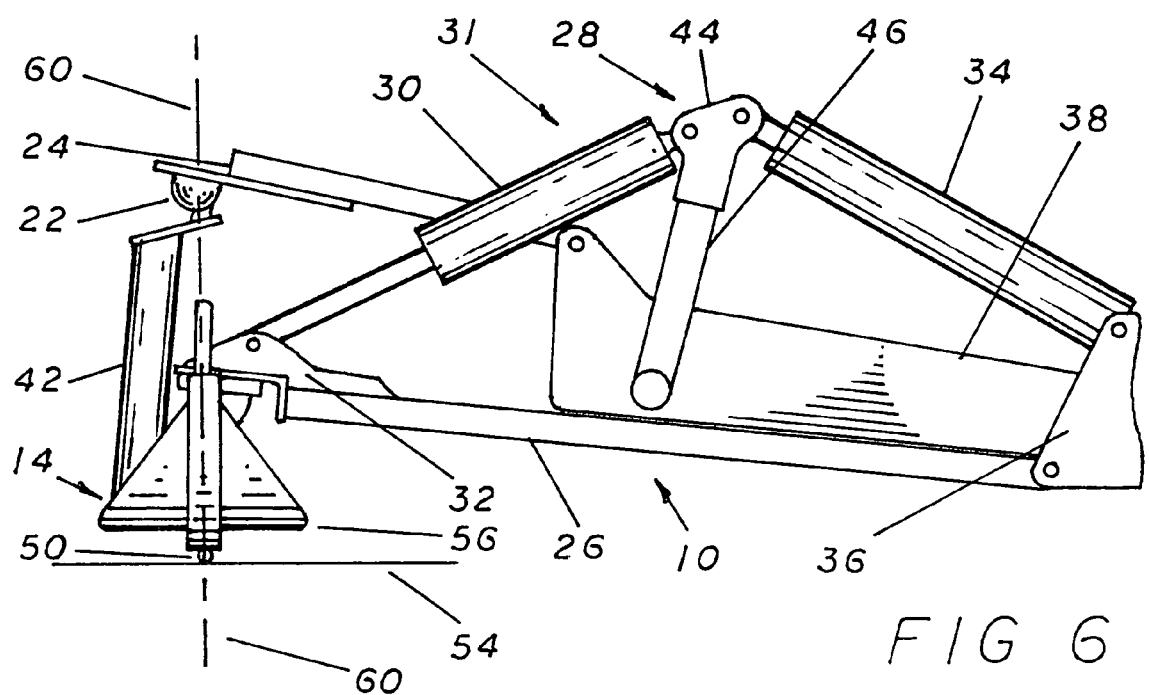
FIG. 6 is a front elevation view of one side of the present invention illustrating its configuration when the ski has fully lowered the attached apparatus to the surface upon which the skis rest.

The operation of the height control system 31 to control the relative height of the skis 14 and their related ski angles is further detailed in FIGS. 4, 5, and 6. The operation of the height control system 31 is critical not only to the operation of the present invention in the raising and lowering functions, but also in the ability to break a frozen in ski 14 loose without requiring any effort from the operator. In describing the performance of these functions of the present invention, it is necessary to first examine the nature of the interaction of the ski 14 and the surface 54.

The contact point between the ski 14 and the surface 54 is made at the skag 50 which is a generally cylindrical metallic apparatus that protrudes downwards from and runs down the length of the ski runner 52 where it contacts the surface 54. The purpose of the skag 50 is to provide a degree of resistance to the abrasive forces along the point of contact between the ski 14 and surface 54 and also to lessen the ski's 14 tendency to slide laterally in certain operational situations. A problem generally associated with the skag 50 is that its exposed position places a lot of adverse forces on it which can lead to its damage or destruction. Additionally, the freeze in of the skis 14 can also result in damage to the skag 50 as the methods generally employed to break the skis 14 loose placed a very large amount of lateral pressure on it. Therefore, the present invention provides a method by which the necessary lifting and lowering of the attached structure can be accomplished but also incorporates a method which allows frozen in skis 14 to be broken loose in the lifting and lowering processes.

In the situation where the icehouse is raised up off the surface 54 as detailed in FIG. 4, the lift cylinder 34 is expanded to its maximum length. The expansion of the lift cylinder 34 forces the pivot arm head 44 to rotate outward which in turn forces the shock absorber 30 to move in a similar manner. Such movement of the shock absorber 30 forces the outer end of the lower control arm 26 to rotate downward around its pivotal attachment to the chassis 36. This motion in turn pushes the ski 14 downward relative to the chassis 36 which has the effect of raising the chassis 36 and any attached vehicle up and off the surface 54.

With the components of the present invention in this configuration it is important to note the effect that their individual designs affect the overall operation of the invention. The relative short length of the upper control arm 24 relative to the lower control arm 26 alters the orientation of the body of the ski 14 relative to the surface 54 as the ski 14 is moved through its vertical range of lift illustrated by the ski vertical travel line 60 on these FIGURES. These characteristics are important to the operation of the present invention as will become clear with further discussion.

In the configuration illustrated in FIG. 4 in which the skis 14 are fully extended, the position of the upper pivot joint 22 relative to the ski's vertical travel line 60 illustrates the function of the design of the upper and lower control arms, 24 and 26. The horizontal distance between the center of the upper pivot joint 22 and the inner end of the upper control arm 24 is shortened due to the diagonal position of the upper control arm 24 in this orientation. This has the effect of pulling the upper end of the vertical attachment pillar 42 inward towards the center of the invention. This in turn has the effect of lifting the outer edge of the ski 14 and dropping its inner edge resulting in a 93° ski angle 56.

As the present invention begins the lowering process as illustrated in FIG. 5, the lift cylinder 34 starts to contract which in turn rotates the pivot arm 28 inwards towards the center of the invention. This rotation has the effect of pulling the shock absorber 30 inwards which in turn lifts the outer end of the lower control arm 26 and the ski 14 relative to the chassis 36. This has the effect of lowering an attached vehicle towards the surface 54. The outer end of the upper control arm 24 rises which has the effect of increasing the distance to its pivotal attachment at the chassis arm 38. The increase of this distance then forces the upper end of the vertical attachment pillar 42 outward past the ski's vertical travel line 60. This outward movement in turn rotates the outer edge of the ski 14 downward and its inner edge upwards. The change in the skits orientation in respect to the surface 54 results in a 86° ski angle 58 in this position of the present invention.

Finally, as the present invention completes the lowering process as illustrated in FIG. 6, the lift cylinder 34 in the fully contracted position rotates the pivot arm 28 to its full inner position. This pulls the shock absorber 30 still further inwards which in turn pulls the outer end of the lower control arm 26 to a position that is just beyond the horizontal and lifts the ski 14 to its highest position. With the components of the present invention in this configuration, an attached vehicle is lowered onto the surface 54 where it can be employed as designed. In this configuration, the upper control arm 24 is inclined slightly and the upper pivot joint 22 at its outer end bisects the ski's vertical travel line 60. This results in a 90° ski angle 62 with respect to the surface 54 in which it will remain until the operation described is repeated to raise the present invention.

The alterations in the orientation of the ski 14 relative to the surface 54 and the ski's 14 ability to travel in a defined vertical path during the raising and lowering operations is the mechanism employed by the present invention to break a frozen in ski loose without requiring effort from the user and without causing damage to the ski 14 and the attached skag 50. The vertical travel of the ski 14 in these processes means that there are no lateral forces to overcome. The elimination of lateral forces from these processes reduces the energy required to accomplish them and also lessens the probability of damaging the ski 14 and its components during the raising and lowering procedure. Finally, the operational relationship between the upper and lower control arms, 24 and 26, causes the ski 14 to roll slightly from side to side during the raising and lowering process. This sideways rolling motion imparts the exact forces and motions to the skis 14 to effectively break them loose in the event that they become frozen into the surface 54 of the ice or snow. Thus, the use of the present invention provides a user with the ability to raise and lower a suspended skied vehicle in an effective and safe manner that also provides a mechanism that allows frozen in skis 14 to be broken loose in a manner that does not damage them.

Finally, the elimination of any lateral movement of the skis 14 during the raising and lowering procedures also ensures that these process require less effort than is otherwise possible because of the elimination of the resistance created by the skag's 50 side scrubbing over the surface 54. Additionally, the substantially vertical travel of the skis 14 will have the added benefits of reducing the damage to the relevant components of the invention such as the skags 50, reducing the cost of producing these components due to the ability of incorporating inexpensive construction materials and methods, and reduce the costs and size of the lift cylinder 34 that is required to perform these operations.

Although the present invention has been described in considerable detail with reference to certain preferred versions thereof, other versions are possible. Therefore, the spirit and scope of the appended claims should not be limited to the description of the preferred versions contained herein.

What is claimed:

1. A ski suspension system for raising and lowering ski assembly on a vehicle having a central chassis section with an outwardly extending chassis arm section forming a front chassis, said chassis arm section having an outer end and an inner section, said ski suspension system comprising:
   said front chassis having a vertical post assembly extending upward from said ski;
   having an upper arm assembly length, said upper arm assembly also having a ski end and a chassis end with said ski end be pivotally connected to said ski post and said chassis end being pivotally connected to said outer end of said chassis arm;
   having a lower arm assembly length, said lower arm assembly length being greater than that of said upper arm assembly length, said lower arm assembly length further having a ski end and a chassis end with said lower arm assembly ski end being pivotally attached to said vertical post assembly and said lower arm assembly chassis end being pivotally attached to said front chassis;
   a pivot arm having a pivot arm body pivotally connected to said front chassis and an upper pivot arm head;
   a connection means between said pivot arm head and said ski assembly; and
   a means of pivoting said pivot arm about said pivot arms lower pivot point so as to selectively raise and lower said ski assembly relative to said front chassis in a substantially vertical plane.

2. A ski suspension system as in claim 1 wherein said connection means is a shock absorber assembly.

3. A ski suspension system as in claim 2 wherein said means of pivoting said pivot arm is a hydraulic cylinder assembly connecting said pivot arm head and said front chassis.

4. A ski suspension system as in claim 3 wherein said upper arm assembly ski end attaches to said vertical post assembly at a point above said lower arm assembly relative to said ski.

5. A ski suspension system as in claim 4 further comprising a steering arm attached to said ski assembly.

6. A ski suspension system as in claim 1 wherein connection means is a solid link.

7. A ski suspension system as in claim 1 wherein said system is duplicated on the left and right side of said front chassis.

8. A ski suspension system for raising and lowering ski assembly on a vehicle having a central chassis section with an outwardly extending chassis arm section forming a front chassis, said chassis arm section having an outer end and an inner section, said ski suspension system comprising:
- said front chassis having a vertical post assembly extending upward from said ski;
- having an upper arm assembly length, said upper arm assembly also having a ski end and a chassis end with said ski end be pivotally connected to said ski post and said chassis end being pivotally connected to said outer end of said chassis arm;
- having a lower arm assembly length, said lower arm assembly length being greater than that of said upper arm assembly length, said lower arm assembly length further having a ski end and a chassis end with said lower arm assembly ski end being pivotally attached to said vertical post assembly and said lower arm assembly chassis end being pivotally attached to said front chassis;
- a pivot arm having a pivot arm body pivotally connected to said front chassis and an upper pivot arm head; and
- a shock absorber between said pivot arm head and said ski assembly.

9. A ski suspension as in claim 8 further comprising an expanding and contracting powered assembly connecting pivot arm head to said front chassis such that the expansion and contraction of said powered assembly raises and lowers said ski assembly relative to said front chassis in a substantially vertical plane.

10. A ski suspension as in claim 9 wherein said powered assembly is a hydraulic cylinder.

11. A ski suspension system as in claim 10 wherein said upper arm assembly ski end attaches to said vertical post assembly at a point above said lower arm assembly relative to said ski.

12. A ski suspension system as in claim 11 further comprising a steering arm attached to said ski assembly.

13. A ski suspension system as in claim 8 wherein, shock absorber is replaced by a solid link.

14. A ski suspension system as in claim 12 wherein said system is duplicated on the left and right side of said front chassis.

15. A ski suspension system for raising and lowering ski assembly having a vertical post assembly extending upward from said ski, on a vehicle having a central chassis section with an outwardly extending chassis arm section forming, said chassis arm section having an outer end and an inner section, said ski suspension system comprising:
- having an upper arm assembly length, said upper arm assembly also having a ski end and a chassis end with said ski end be pivotally connected to said ski post and said chassis end being pivotally connected front chassis;
- having a lower arm assembly length, said lower arm assembly length not equal to that of said upper arm assembly length, said lower arm assembly length further having a ski end and a chassis end with said lower arm assembly ski end being pivotally attached to said vertical post assembly at a point below said upper arm assembly and said lower arm assembly chassis end being pivotally attached to said front chassis;
- a pivot arm having a pivot arm body pivotally connected to said front chassis and an upper pivot arm head;
- a shock absorber between said pivot arm head and said ski assembly; and
- an expanding and contracting powered assembly connecting pivot arm head to said front chassis such that the expansion and contraction of said powered assembly raises and lowers said ski assembly relative to said front chassis in a substantially vertical plane.

16. A ski suspension as in claim 9 wherein said powered assembly is a hydraulic cylinder.

17. A ski suspension system as in claim 16 wherein said upper arm assembly ski end attaches to said vertical post assembly at a point above said lower arm assembly relative to said ski.

18. A ski suspension system as in claim 17 further comprising a steering arm attached to said ski assembly.

19. A ski suspension system as in claim 18 wherein shock absorber is replaced by a sold link.

20. A ski suspension system as in claim 15 wherein said system is duplicated on the left and right side of said front chassis.

* * * * *